United States Patent [19]

Bablitz

[11] Patent Number: 5,123,236
[45] Date of Patent: Jun. 23, 1992

[54] ROTARY MOWER BLADE WITH RAKE SPRINGS

[76] Inventor: Leo Bablitz, 7915-131A Avenue, Edmonton, Alberta, Canada, T5C 2A2

[21] Appl. No.: 491,058

[22] Filed: Mar. 9, 1990

[51] Int. Cl.⁵ .................. A01D 7/06; A01D 34/64; A01D 34/73; A01D 34/82
[52] U.S. Cl. .................. 56/17.5; 56/295; 56/DIG. 17; 56/DIG. 20; 56/DIG. 9; 56/193
[58] Field of Search ............ 56/295, 255, 17.5, 16.1, 56/193, 400.04, 400.05, DIG. 20, DIG. 17, DIG. 9

[56] References Cited

U.S. PATENT DOCUMENTS

| | | | |
|---|---|---|---|
| 2,795,916 | 6/1957 | Miller | 56/295 X |
| 3,109,274 | 11/1963 | Sheppard | 56/295 |
| 3,511,036 | 5/1970 | Sulian | 56/17.5 |
| 3,753,338 | 8/1973 | Sherratt | 56/17.5 |
| 3,753,341 | 8/1973 | Berg, Jr. et al. | 56/295 X |
| 3,857,226 | 12/1974 | Sifakas | 56/295 |
| 3,964,243 | 6/1976 | Knipe | 56/17.5 |
| 4,374,465 | 2/1983 | Comer | 56/295 X |

*Primary Examiner*—Stephen J. Novosad
*Attorney, Agent, or Firm*—Fleit, Jacobson, Cohn, Price, Holman & Stern

[57] ABSTRACT

A rotary lawn mower blade is provided with opposite end dependingly supported rake springs. Each of the springs comprises a closed coil spring body whose upper end is removably supported from the underside of the corresponding rotary mower blade end and the lower convolution of each coil spring body includes a downwardly directed vertical spring tine or finger. The mower blade incorporates a pair of elongated opposite end blade end sections including remote and adjacent ends with the adjacent ends thereof disposed in end overlapped engagement with each other and the adjacent ends include meshed projections and recesses spaced longitudinally therealong. The adjacent ends are longitudinally slotted and a threaded shank type fastener is passed upwardly through the slots and may be threaded in a blind bore formed in the lower end of the vertical engine shaft of a rotary mower.

11 Claims, 1 Drawing Sheet

U.S. Patent     June 23, 1992     5,123,236
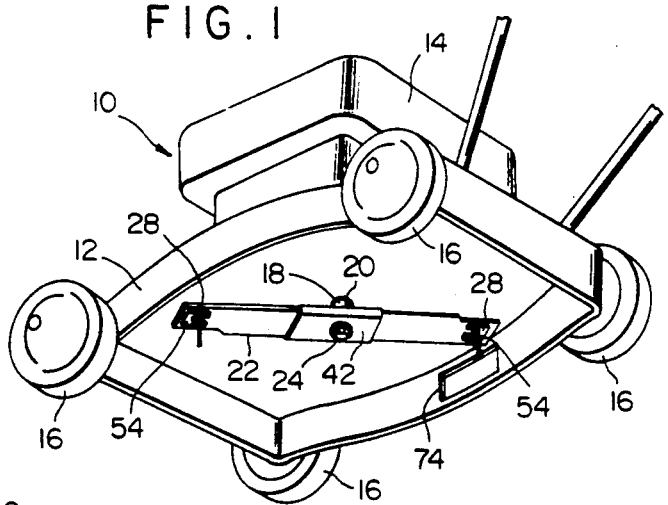
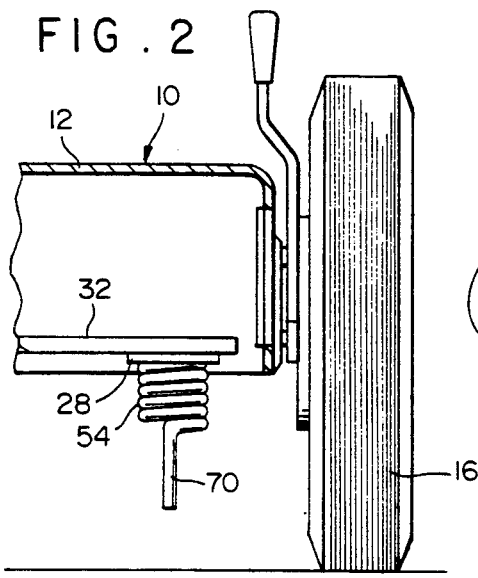
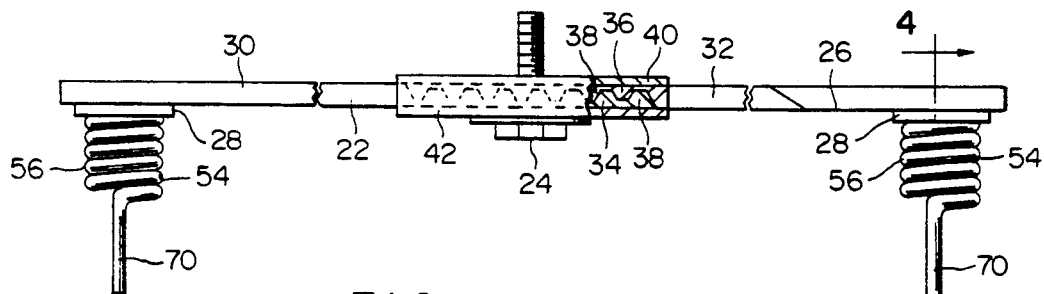
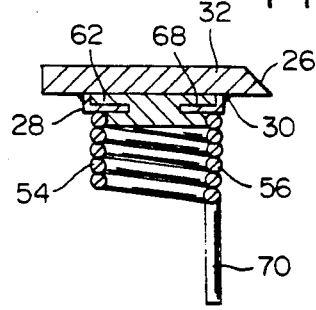
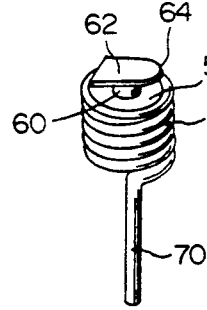
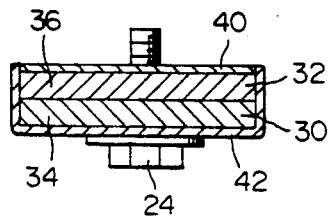
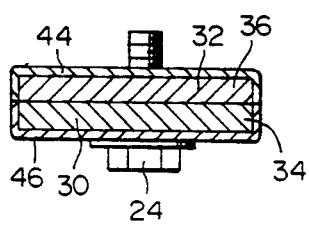
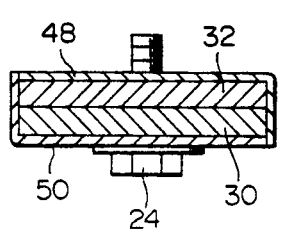

ROTARY MOWER BLADE WITH RAKE SPRINGS

FIELD OF THE INVENTION

This invention relates to a pair of depending rake springs or tines carried by the opposite ends of a rotary mower blade, the upper ends of the tines being formed integrally with the lower convolution of a closed convolution coil spring whose upper convolution is anchored to the underside of the associated mower blade and the coil spring is anchored to the blade through the utilization of an enlarged head supported from a shank projecting upwardly from the coil spring. The enlarged head is removably seated in a recessed provided therefore on the underside of the mower blade and the mower blade consists of a pair of opposite end blade sections having adjustably overlapped adjacent ends.

DESCRIPTION OF THE RELATED ART

Various different forms of thatching and raking attachments for rotary mower blades heretofore have been provided. Examples of various different forms of these attachments including some of the general structural and operational features of the instant invention are disclosed in U.S. Pat. Nos. 3,511,036, 3,753,338, 3,857,226 and 3,964,243. However, these previously known forms of attachments do not include the overall combination of structural features of the instant invention resulting in a device which accomplishes a leaf raking operation in a most efficient manner and which is readily adjustable in length.

SUMMARY OF THE INVENTION

The rake springs of the instant invention are mounted from opposite ends of an adjustable length rotary mower blade. The springs each comprise closed convolution coil springs incorporating five complete convolutions and the coil spring is vertically disposed. The upper end of each coil spring includes an upwardly projecting mounting shank equipped with an upper end enlarged head removably received in a recess therefore defined on the corresponding blade end. The lower convolution of each coil spring terminates downwardly in a vertically disposed and downwardly directed tine or finger laterally offset relative to the longitudinal center axis of the spring.

The main object of this invention is to provide an attachment for an adjustable length rotary mower blade for the purpose of converting the mower blade into a raking and mulching blade.

Another object of this invention is to provide a leaf raking attachment in accordance with the preceding object and constructed in a manner whereby an efficient leaf raking and mulching operation may be performed thereby while still enabling the leaf raking attachment to yield when striking a solid object.

Yet another object of this invention is to provide a leaf raking attachment for a rotary mower blade which is adjustable in length and therefore usable on mowers normally equipped with different length blades.

Another important object of this invention is to provide a rotary mower leaf raking attachment which is mounted from the associated rotary mower blade in a manner such that the attachment may be readily removed.

A final object of this invention to be specifically enumerated herein is to provide a rotary mower blade leaf raking attachment in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an underside perspective view of a conventional form of rotary lawn mower with the opposite ends of the horizontal mower blade thereof equipped with raking springs constructed in accordance with the instant invention;

FIG. 2 is an enlarged fragmentary transverse vertical sectional view of the lawn mower taken substantially upon a plane closely paralleling the rotary mower blade thereof and illustrating the manner in which a rake spring constructed in accordance with the present invention is supported from one of the ends of the rotary mower blade;

FIG. 3 is an enlarged fragmentary elevational view of the mower blade with the central portions thereof broken away and illustrated in vertical section;

FIG. 4 is an enlarged vertical sectional view taken substantially upon the plane indicated by the section line 4—4 of FIG. 3;

FIG. 5 is an enlarged top perspective view of one of the rake springs; and

FIGS. 6, 7 and 8 are vertical sectional views illustrating three different blade section joining structures.

DESCRIPTION OF THE PREFERRED EMBODIMENT

Referring now more specifically to the drawings the numeral 10 generally designates a conventional form of rotary lawn mower. The lawn mower 10 includes a body deck 12 from which a vertical shaft engine 14 is supported and the body deck 12 includes support wheels 16 journaled therefrom. In addition, the lower end of the vertical shaft 18 of the engine 14 projects through an opening 20 provided therefore in the body deck 12 and has a horizontal, rotary lawn mower blade 22 mounted therefrom through the utilization of an attaching bolt 24. The blade 22 has opposite side margins thereof sharpened at the opposite ends of the blade 22 as at 26 and each opposite end of the blade 22 has a mounting bracket 28 supported from the underside thereof in any convenient manner such as by welding 30.

With attention now invited more specifically to FIGS. 3 and 6 of the drawings, the blade 22 includes opposite end blade sections 30 and 32 including overlapped adjacent ends 34 and 36, respectively. Each of the overlapped adjacent ends 34 and 36 is centrally longitudinally slotted and provided with interlocking rack gear teeth 38. The end section 38 has a longitudinally centrally apertured plate 40 disposed thereover and the end portion 34 is received in a longitudinally centrally apertured channel member 42, the apertures in the plate 40 and channel member 42 being registered with each other and the longitudinal slots formed in the overlapped adjacent ends 34 and 36. The bolt 24 passes through the apertures formed in the channel member 42 and the plate 40 as well as the slots in the adjacent end overlapped ends 34 and 36 and is threadedly engaged in a blind bore (not shown) formed in the lower end of the vertical shaft 18. Thus, the blade 22 is illustrated in FIG. 3 in its shortest longitudinal dimension state. However, if it is desired to lengthen the blade 22, it is merely necessary to loosen the bolt 24 sufficiently to enable the plate 40 to be displaced upwardly out of the upper extremity of the channel member 42 a vertical distance slightly greater than the vertical extent of the teeth 38 and to thereafter equally displace the mounting bracket ends of the 30 and 32 away from the mounting bolt 24 to thereby enable the teeth 38 of one blade section to be seated between different teeth 38 of the other blade section. Thereafter, the bolt 24 is tightened.

With attention invited more specifically to FIG. 7, instead of providing the plate 40 and channel member 42 between which to clamp the adjacent ends 34 and 36 of the blade end sections 30 and 32 as illustrated FIG. 6, the adjacent ends 34 and 36 are clamped between upper and lower downwardly and upwardly opening channel members 44 and 46 which are also longitudinally slotted. Although the interface between the channel members 44 and 46 is disposed substantially at the mid-vertical thickness zone of the blade 22, the interlocking teeth 38 carried by the end 34 project above the upper extremity of the channel member 46 and into the channel member 44. Thus, the overlapped adjacent ends 34 and 36 of the end sections 30 and 32 remain locked together against relative angular displacement.

With attention invited more specifically to FIG. 8, a pair of longitudinally slotted mirror image angle members 48 and 50 are used to clamp the end sections 30 and 32 together in lieu of the plate 40 and channel member 42.

With reference now to FIGS. 3, 4 and 5, it may be seen that the blade 22 is equipped with opposite end rake springs 54 each including a five convolution, closed convolution coil spring body 56. The upper end of each coil spring body 56 has a disc shaped body 58 secured therein in any convenient manner and each body 58 includes an upwardly projecting shank 60 including a horizontally enlarged head 62 on its upper end.

Each head 62 is generally rectangular in plan shape with one rounded end 64 and each mounting bracket 28 defines a guideway 68 of substantially the same plan and cross sectional shape as a corresponding head 62, the remote ends of the guideways 68 being closed and the adjacent ends thereof being open. Accordingly, the heads 62 may be snugly slidably received within the adjacent open ends of the guideways 68.

The heads 62 are removably frictionally retained in the guideways 68 whereby the springs 54 may be readily added to or removed from the remote ends of the end sections 30 and 32 of the blade 22.

Also, the lowermost convolution of each rake spring 54 terminates downwardly in a vertically downwardly directed spring finger or tine 70.

Inasmuch as the tine or finger 70 depends vertically downwardly from the outer periphery of the coil spring body 56, the tine or finger 70 is laterally offset from the longitudinal center axis of the coil spring body 56.

When the blade 22 is rotating at high speed, the tines 70 project considerably downwardly below the level at which the blade 22 cuts the associated grass by the sharpened portions 26 of the blade 22. Thus, thatch is scratched from the area immediately above the ground as grass is being cut and the grass and thatch is vacuumed up from the surface of the lawn disposed immediately beneath the body deck 12 and discharged outwardly through the opening 74 of the body deck 12. Of course, the presence of the coil spring bodies 56 increase the air handling capacity of the blade 22 as the latter is rotated at high speeds and contact of the lower ends of the tines 70 with stationary objects will result in the tines 70 and convolutions of the raking springs 54 yielding under the pressure of contact.

If the associated lawn does not have a deep leaf cover thereon, the raked and mulched leaves as well as the cut grass and thatch may be merely discharged through the opening 74 and allowed to return to the lawn surface, the fineness of the mulched leaves, grass and thatch being sufficient to allow the discharged mulched leaves, grass and thatch to fall back onto the lawn surface between the blades of grass thereof. On the other hand, if the ground cover of leaves is thick, the wheels 16 may be lowered so that the springs 54 contact and mulch the leaves which then are discharged through the opening 74 and may be collected in a collection bag (not shown) operatively associated with the opening 74 in any convenient manner.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination, an elongated rotary blade for mounting in horizontal position from the lower end of a powered vertical output shaft with said shaft disposed centrally intermediate the opposite ends of said blade, a pair of rake springs mounted from said blade ends, said rake springs including closed convolution coil spring bodies each having upper and lower ends, said upper ends including upwardly projecting, headed mounting shanks, said opposite ends including brackets mounted therebeneath defining elongated guideways extending longitudinally of said blade and including open and closed adjacent and remote ends, respectively, said heads being snugly and slidably received in said guideways, the lower convolution of each spring body including a substantially vertical downturned integral lower end portion extending downwardly from the periphery of the corresponding coil spring body and thus laterally offset relative to the center axis of said coil spring body.

2. The combination of claim 1 wherein said coil spring bodies each include at least four complete convolutions.

3. The combination of claim 2 wherein said coil spring bodies each include five complete convolutions.

4. The combination of claim 1 wherein said elongated blade member includes a pair of elongated opposite end blade sections including remote and adjacent ends, said adjacent ends being end overlapped with each other and including meshed projections and recesses spaced therealong, said adjacent ends being centrally longitudinally slotted, and threaded fastening means slidably and rotably received through the overlapped slotted adjacent ends of said end portions and adapted to be threadedly engaged within a threaded blind bore formed in said rotary output shaft.

5. The combination of claim 4 including a centrally apertured channel member in which said end overlapped adjacent ends are received and a centrally apertured plate overlying the uppermost overlapped adjacent end and received within said channel member, said threaded fastening means passing through the apertures formed in said channel member and plate.

6. The combination of claim 4 including a pair of relatively inverted and centrally apertured channel members embracingly engaged about said overlapped adjacent ends from above and below the latter, said threaded fastening means extending through the apertures formed in said channel members.

7. The combination of claim 4 including a pair of mirror image angle members embraced about said overlapped adjacent ends from above and below the latter, said angle members including registered apertures formed therethrough, said threaded fastening means also passing through said registered apertures.

8. An elongated rotary blade for mounting in horizontal position from the lower end of a powered vertical output shaft with said shaft disposed centrally intermediate the opposite ends of said blade, said blade including opposite end blade sections including remote and adjacent ends with said adjacent ends overlapped engaged with each other, said adjacent ends being centrally longitudinally slotted and equipped with meshed rack gear teeth spaced longitudinally along said blade, threaded fastening means passing through the slots of said overlapped adjacent ends and adapted to be threadedly engaged in a blind bore formed in said lower end of said vertical output shaft, said meshed rack gear teeth equipped and centrally slotted adjacent ends and said threaded fastening means passing through said slots coacting to enable said adjacent ends to be secured relative to each other in adjustably overlapped relation for varying the length of said blade.

9. The combination of claim 8 including a centrally apertured channel member in which said end overlapped adjacent ends are received and a centrally apertured plate overlying the uppermost overlapped adjacent end and received within said channel member, said threaded fastening means passing through the apertures formed in said channel member and plate.

10. An elongated rotary blade for mounting in horizontal position from the lower end of a powered vertical output shaft with said shaft disposed centrally intermediate the opposite ends of said blade, said blade including opposite end blade sections including remote and adjacent ends with said adjacent ends overlapped engaged with each other, said adjacent ends being centrally longitudinally slotted and provided with meshed projections and recesses spaced longitudinally along said blade, threaded fastening means passing through the slots of said overlapped adjacent ends and adapted to be threadedly engaged in a blind bore formed in said lower end of said vertical output shaft, a pair of relatively inverted and centrally apertured channel members embracingly engaged about said overlapped adjacent ends from above and below the latter, said threaded fastening means extending through the apertures formed in said channel members.

11. An elongated rotary blade for mounting in horizontal position from the lower end of a powered vertical output shaft with said shaft disposed centrally intermediate the opposite ends of said blade, said blade including opposite end blade sections including remote and adjacent ends with said adjacent ends overlapped engaged with each other, said adjacent ends being centrally longitudinally slotted and provided with meshed projections and recesses spaced longitudinally along said blade, threaded fastening means passing through the slots of said overlapped adjacent ends and adapted to be threadedly engaged in a blind bore formed in said lower end of said vertical output shaft, a pair of mirror image angle members embraced about said overlapped adjacent ends from above and below the latter, said angle members including registered apertures formed therethrough, said threaded fastening means also passing through said registered apertures.

* * * * *